(12) United States Patent
Estes

(10) Patent No.: US 6,682,292 B2
(45) Date of Patent: Jan. 27, 2004

(54) MOTORCYCLE TOW RACK WITH YAW BRACE FOR A RECEIVER HITCH

(75) Inventor: David W. Estes, Arlington, TX (US)

(73) Assignee: CODEV Corp., Rockford, IL (US)

( * ) Notice: Subject to any disclaimer, the term of this patent is extended or adjusted under 35 U.S.C. 154(b) by 176 days.

(21) Appl. No.: 10/033,136

(22) Filed: Dec. 28, 2001

(65) Prior Publication Data

US 2003/0123964 A1 Jul. 3, 2003

(51) Int. Cl.[7] ................................................ B60D 1/167
(52) U.S. Cl. ..................... 414/462; 280/402; 410/3; 414/427; 414/428; 414/429; 414/480
(58) Field of Search ........................ 224/521; 280/400, 280/402; 410/3; 414/426, 427, 428, 429, 430, 462, 480

(56) References Cited

U.S. PATENT DOCUMENTS

| 3,822,898 | A |   | 7/1974  | Brownlie |
|-----------|---|---|---------|----------|
| 3,920,266 | A | * | 11/1975 | Rendessy ................. 280/455.1 |
| 4,111,449 | A |   | 9/1978  | Hancock |
| 4,243,243 | A | * | 1/1981  | Edmisten ................ 414/462 X |
| 4,592,564 | A |   | 6/1986  | Warnock et al. |
| 5,011,361 | A |   | 4/1991  | Peterson |
| 5,145,308 | A |   | 9/1992  | Vaughn et al. |
| 5,181,822 | A |   | 1/1993  | Allsop et al. |
| 5,366,338 | A |   | 11/1994 | Mortensen |
| 5,560,628 | A |   | 10/1996 | Horn |
| 5,620,197 | A |   | 4/1997  | Howes |
| 5,794,959 | A | * | 8/1998  | Scheef, Jr. ............... 414/462 X |
| 5,906,386 | A | * | 5/1999  | Baker et al. ................. 280/404 |
| 5,950,617 | A |   | 9/1999  | Lorenz |
| 6,244,813 | B1|   | 6/2001  | Cataldo |

* cited by examiner

Primary Examiner—Janice L. Krizek
(74) Attorney, Agent, or Firm—Mark W. Handley; Chauza & Handley, L.L.P.

(57) ABSTRACT

A motorcycle tow rack (12) has a cradle (20) which is pivotally secured to a tow rack frame (50) for receiving a wheel (22) of a motorcycle (14). The cradle (20) and the tow rack frame (50) are pivotally secured to a receiver hitch (16) of a towing vehicle (18). Two clamping plates (30), two clamp arms (28) and a pivot plate (32) secure the motorcycle wheel (22) to the cradle (20). Stabilizer bars (62) are pivotally secured to the receiver hitch (16) and are slidably secured to the tow rack frame (50). Tie down members (34) extend from two stabilizer bars (62) to the motorcycle frame (40). Tie down members (35) extend from the tow rack frame (50) to the motorcycle frame (40). Yaw braces (44) secure handlebars (46) of the motorcycle (14) in fixed relation to the motorcycle frame (40).

24 Claims, 9 Drawing Sheets

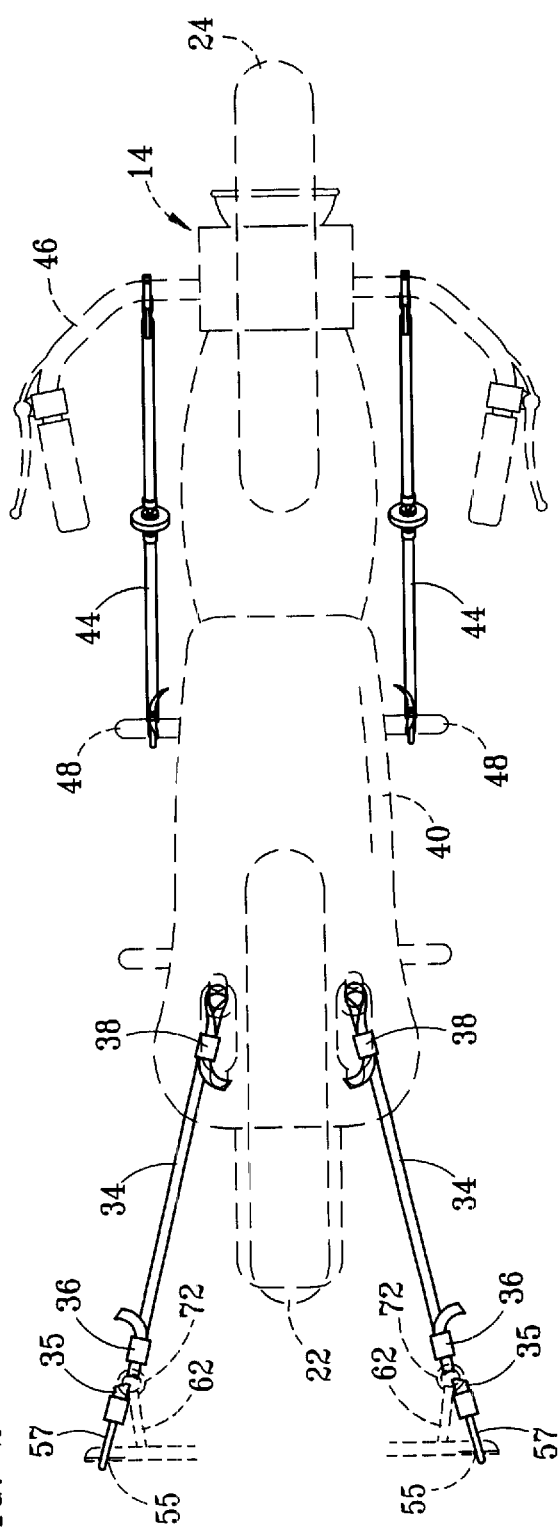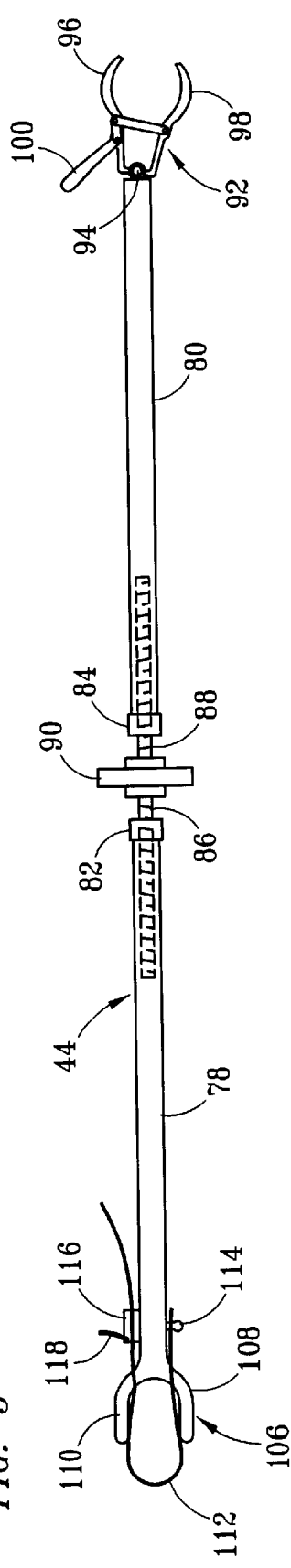

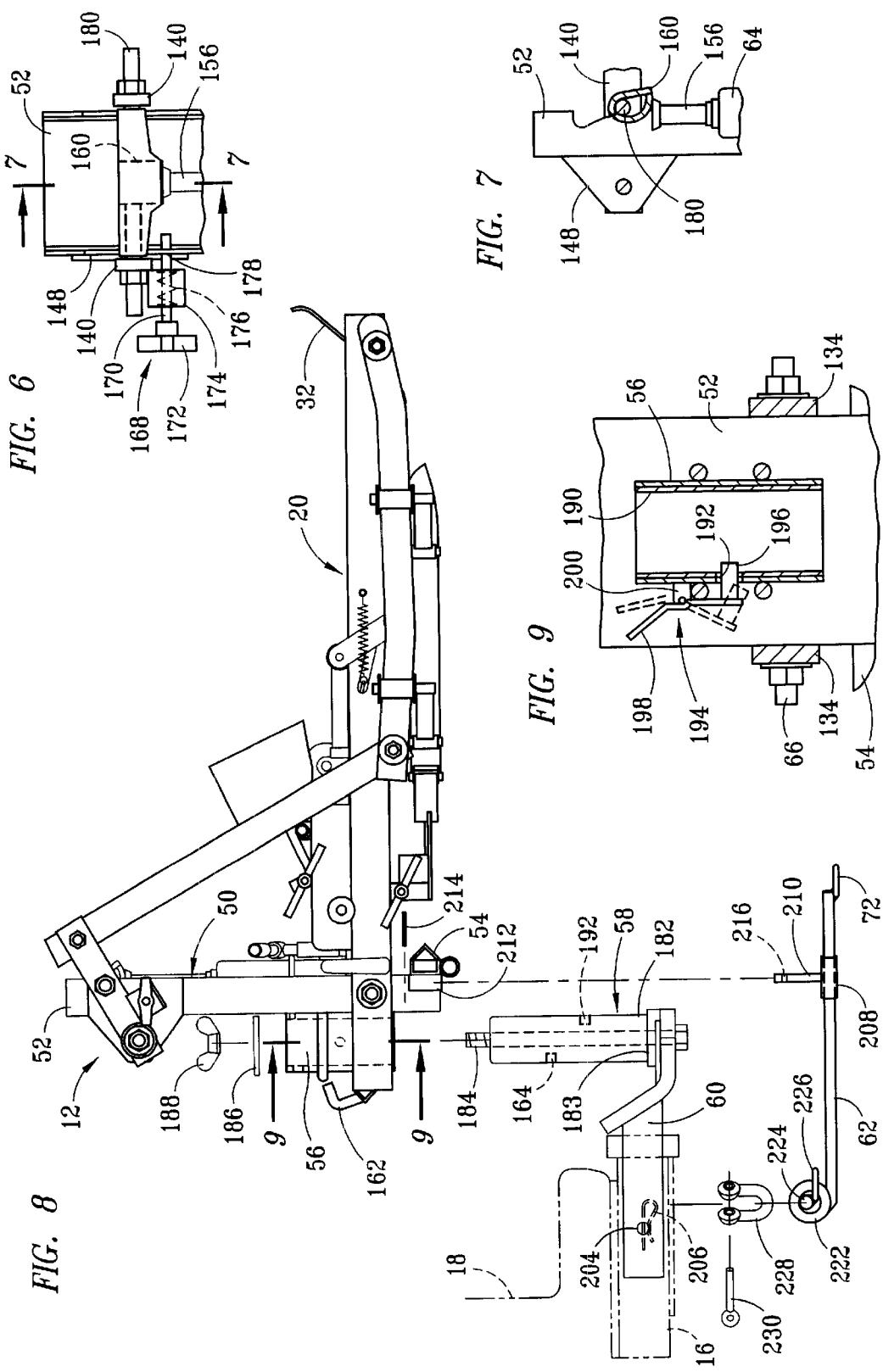

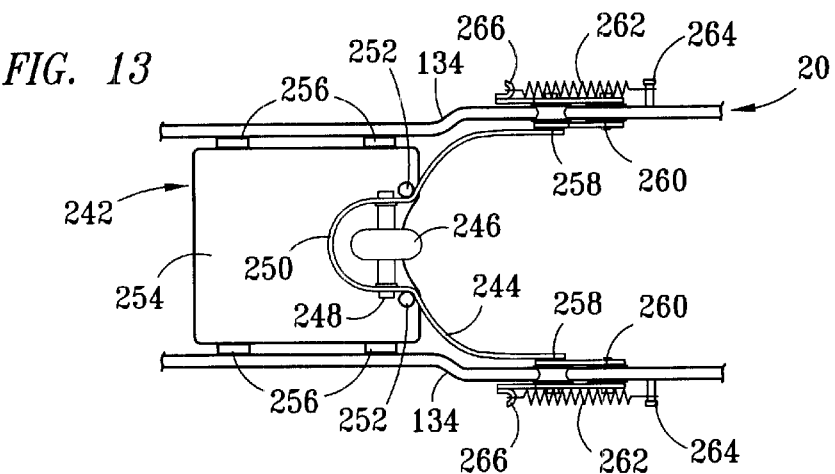
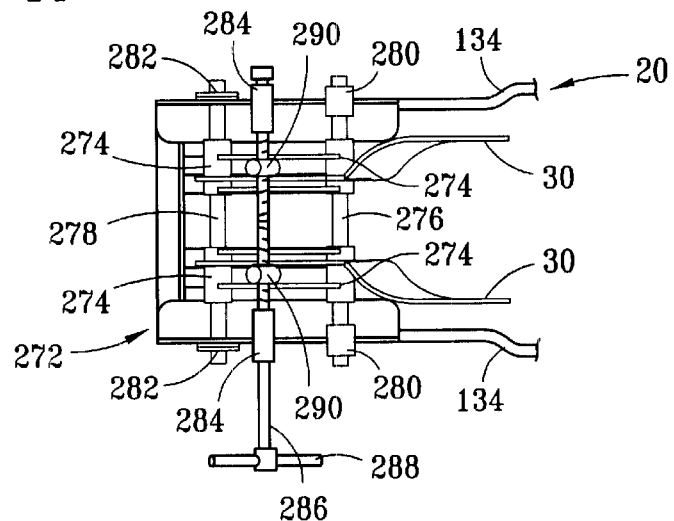
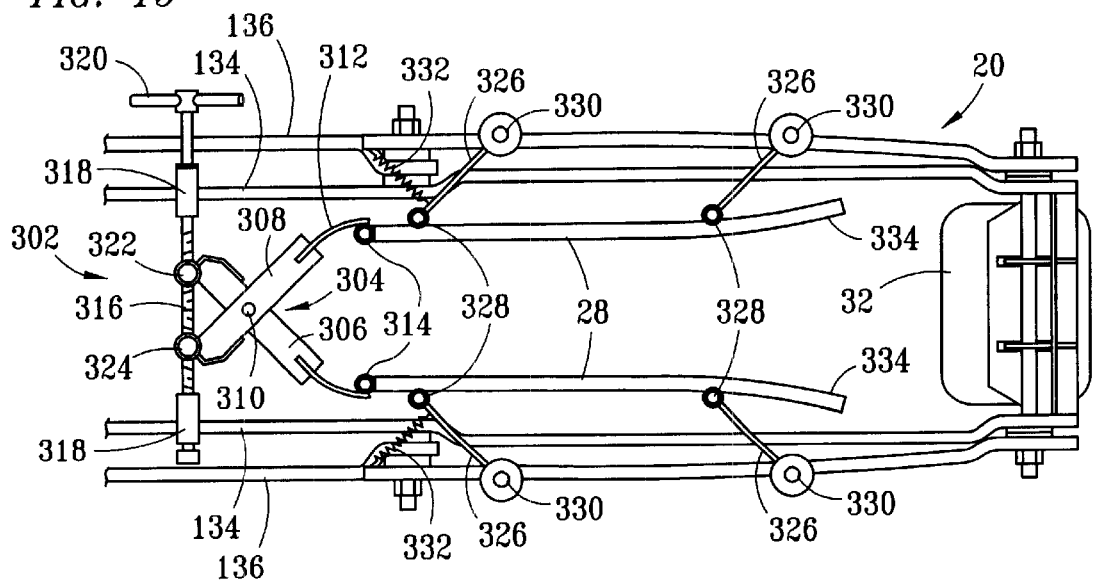

MOTORCYCLE TOW RACK WITH YAW BRACE FOR A RECEIVER HITCH

TECHNICAL FIELD OF THE INVENTION

The present invention relates in general to tow racks for motorcycles, and in particular to a motorcycle tow rack for a receiver hitch having a yaw brace.

BACKGROUND OF THE INVENTION

Tow racks have been provided for towing motorcycles behind motor vehicles, some for use with receiver hitches. These tow racks have included lower arms for supporting one of the wheels of a motorcycle above a ground surface, as the other wheel of the motorcycle is in rolling contact with the ground surface. Typically, the front wheel of the motorcycle is supported on the lower arms, and the rear wheel is in contact with the ground. While suitable for towing at lower speeds, problems have been encountered with gearing and bearings when motorcycles have been towed at highway speeds with rear wheels rolling on the ground. Tie down members have been used to secure the handlebars of towed motorcycles to the frame of the motor vehicle used for towing. Yet, problems have also been encountered with proper tracking of towed motorcycles behind the tow vehicles due to angular movement of the motorcycle frame relative to the front wheel of the motorcycle.

SUMMARY OF THE INVENTION

A motorcycle tow rack is provided having two lower arms which provide a cradle for receiving one of the wheels of a motorcycle. Preferably, the rear wheel of the motorcycle is secured on the two lower arms and the front wheel is in rolling engagement with the ground. The tow rack has a receiver post which is secured in a receiver hitch mounted to the tow vehicle. The rearward end of the receiver post has a pivot post which is rigidly secured thereto and which extends vertically upwards, at a right angle to the receiver post. The tow rack includes a rack frame which is pivotally secured to the pivot post for pivoting around a vertically disposed axis of the pivot post. The rack frame includes a vertically extending mast, which extends upward from a lower portion of the rack frame. The two lower arms are pivotally secured to the rack frame for pivoting around a horizontally disposed axis to lift rearward ends of the two lower arms upward, to raise the rear wheel of the motorcycle upwards from the ground for towing. A jack is disposed between the two lower arms and the vertically extending mast for lifting the rearward ends of the two lower arms upwards. The two lower arms pivot with the tow rack frame and the vertically extending mast relative to the vertical axis pivot post.

Two clamp plates and two clamp arms are provided for securing the forwardly disposed wheel of the motorcycle to the two lower arms defining the cradle. The clamp plates are mounted to a linkage which extends between the two lower arms, on opposite sides of the forwardly disposed wheel of the motorcycle. The two clamp arms are moveably secured to the two lower arms on opposite sides of the forwardly disposed motorcycle wheel for clamping lowermost portions of opposite sides of the front wheel of the motorcycle. The two clamp arms are vertically spaced apart from the two clamp plates, beneath the two clamp plates. A pivot plate is pivotally mounted to the rearward ends of the two lower arms for abutting the rearwardly disposed side of the forwardly disposed motorcycle wheel. Two stabilizer bars have forward ends which are pivotally secured to the receiver hitch frame and which are slidably secured to the tow rack frame. Rearward ends of the two stabilizer bars are secured to tie down members which extend from the two stabilizer bars to the motorcycle frame. Two yaw braces extend between the handlebars and the frame of the motorcycle to secure the handlebars in fixed relation to the frame.

BRIEF DESCRIPTION OF THE DRAWINGS

For a more complete understanding of the present invention and the advantages thereof, reference is now made to the following description taken in conjunction with the accompanying Drawings in which like part are referred to by like numbers:

FIG. 2 is a top view of a motorcycle, shown in phantom, which shows tie down members and yaw braces for securing the motorcycle to the motorcycle tow rack of FIG. 1;

FIG. 3 is a side view of one of the yaw braces;

FIG. 6 is a sectional view of a top portion of the tow rack, taken along section line 6—6 of FIG. 4;

FIG. 7 is a sectional view of a top portion of the tow rack, taken along section line 7—7 of FIG. 6.;

FIG. 8 is and exploded view of the motorcycle tow rack, showing first and second framework portions above a pivot post mounted to the receiver hitch of the tow vehicle;

FIG. 9 is a sectional view of a portion of the motorcycle tow rack, showing a receiver cylinder and a pivot latch;

FIG. 13 is a partial top view of the tow rack, showing a shuttle brace for supporting the motorcycle wheel in the tow rack as the wheel is being secured to the tow rack;

FIG. 14 is a partial top view of the tow rack, showing a clamp plate assembly for securing the motorcycle wheel in the motorcycle tow rack during transport; and FIG. 15 is partial, bottom view of the tow rack, showing a clamp arm assembly for securing a lower portion of the motorcycle wheel in the motorcycle tow rack during transport.

DETAILED DESCRIPTION OF THE INVENTION

Figure 1:
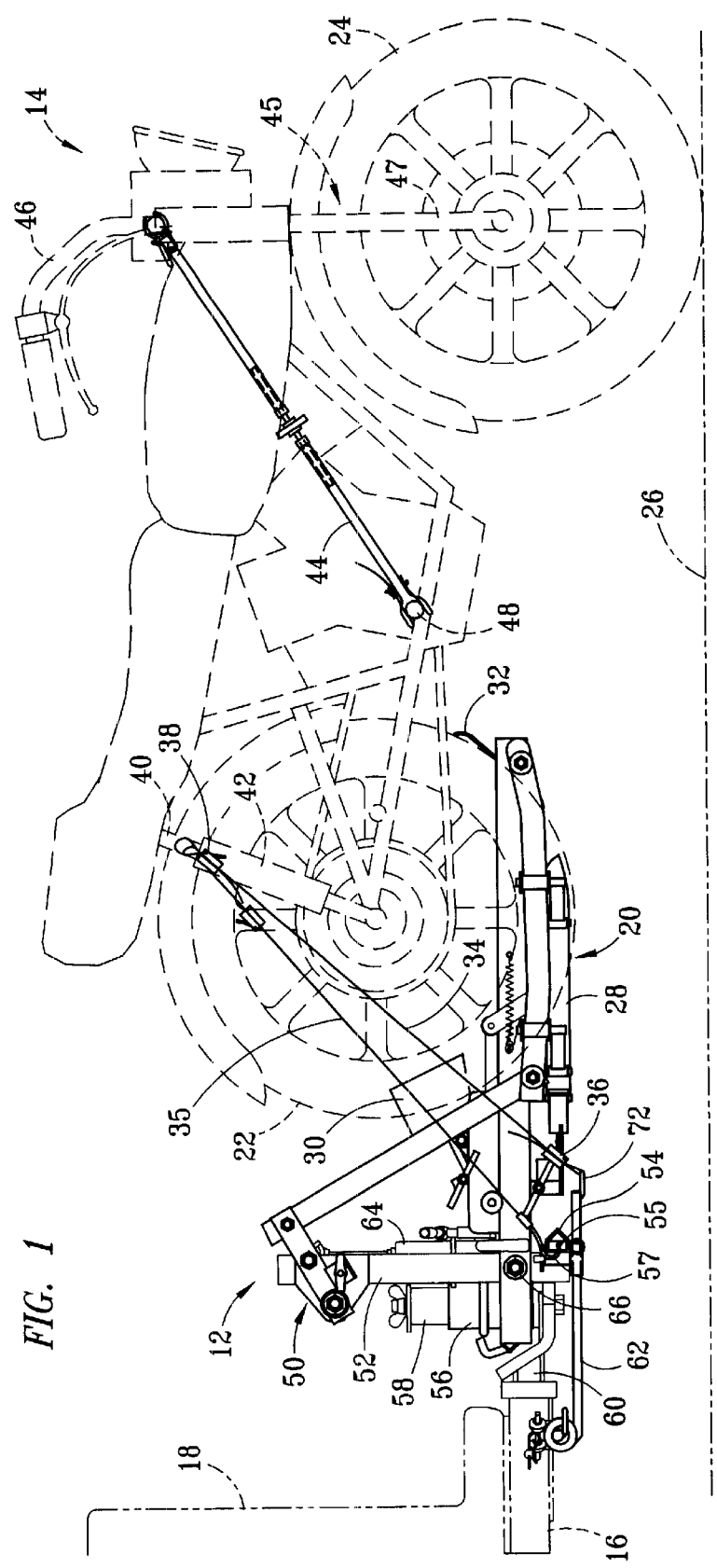
FIG. 1 is a side view of a motorcycle tow rack having a cradle for securing a motorcycle, which is shown in phantom, to a receiver hitch of a tow vehicle, also shown in phantom.

FIG. 1 is a side view of a motorcycle tow rack 12 and a motorcycle 14, which is shown in phantom. The tow rack 12 is securing the motorcycle 14 to a receiver hitch 16 of a tow vehicle 18 for transport. The tow rack 12 has a cradle 20 which provides a framework in which, preferably, a rear wheel 22 of the motorcycle 14 is secured. The rear wheel 22 is disposed in a forward position relative to the tow vehicle and lifted from the surface 26 of the ground, and the front wheel 24 of the motorcycle 14 is disposed in a rearward position, in rolling engagement with the ground surface 26. The tow rack 12 has two clamp arms 28 which clamp to the bottom the bottom of the motorcycle wheel 22 and two clamp plates 30 which clamp to a forwardly disposed portion of the wheel 22 to secure the wheel 22 in the cradle 20. (See also FIGS. 14 and 15). A trip plate 32 is shown extending upwards from a rearward end portion of the cradle 20, adjacent to a rearwardly disposed side of the wheel 22 to prevent the wheel 22 from rolling out of the tow rack cradle 20. The tow rack 12 further includes two tie down members 34 and two tie down members 35 (see also FIG. 2) which are preferably flexible members that are provided by conventional nylon tie down straps. In other embodiments, the tie down members 34 and 35 may be provided by rigid components, such as metal braces, or a combination of metal braces and flexible straps. The tie down members 34 have strap clasps 36 on first ends and rachet strap clasps 38 on second ends, which are secured to the frame 40 of the motorcycle 14 and to rearward ends of two stabilizer bars 62, respectively. The tie down members 35 have hooks 57 on first ends and ratchet clasps 38 on second ends, which are secured to the tow rack 12 and to the frame 40 of the motorcycle 14. Preferably, the tie down members 34 and 35 are secured to the frame 40 in close proximity to the tops of the shocks 42 for the rear wheels 22. The tie down members 35 are preferably tightened first to compress the shocks 42 to reduce the bounce in the shocks 42, which prevents vibration in the tow rack 12 and the motorcycle 14 during towing.

The motorcycle tow rack 12 further includes two yaw braces 44 (see also FIG. 2) which rigidly secure the front wheel 24 of the motorcycle 14 in fixed relation to the motorcycle frame 40. The yaw braces 44 have first ends which are secured to the steering assembly 45 of the motorcycle 14, preferably to the motorcycle handlebars 46. In other embodiments, the yaw braces 44 may be secured to other portions of the steering assembly 45 of the motorcycle 14, including the front forks 47 (shown in phantom). Second ends of the yaw braces 44 are preferably secured to forward foot pegs 48, to secure the second ends of the yaw braces 44 to the motorcycle frame 40. The yaw braces 44 are preferably rigid and selectively extensible. In other embodiments, the yaw braces 44 may be provided by flexible members, such as nylon tie down straps which are configured to rigidly secure the motorcycle frame 40 in fixed relation to the handlebars 46 and the front forks 47 to which the front wheel 24 is rotatably mounted. Securing the front wheel 24 in fixed relation to the frame 14 will cause the front wheel 24 to track directly behind the rear wheel 22, rather than tracking to one side of a path traveled by the front wheel 24.

The motorcycle tow rack 12 comprises two primary framework portions, the first framework portion is a rack frame 50 which is a stationary portion that is pivotally mounted to the receiver hitch 16 of the tow vehicle 18. The second framework portion comprises the cradle 20, which is pivotally mounted to the first framework portion 50. The first frame portion 50 includes a mast 52 which provides a vertically rising member, and two outriggers 54, which horizontally extend outwards on opposite sides of the mast 52. The two outriggers 54 are preferably both provided by a single length angle iron which is welded to the framework portion 50 and which has two holes 55 formed in opposite ends for receiving the hooks 57 of the tie down members 35. A receiver sleeve 56 is fixedly secured to the mast 52 and the outriggers 54, preferably being included as part of a single weldment which includes the mast 52, the outriggers 54 and the sleeve 56. The receiver sleeve 56 is rotatably secured to a pivot post 58. The pivot post 58 extends vertically from and is rigidly secure to a receiver post 60. The receiver post is secured to the receiver hitch 16 of the tow vehicle 18 in conventional fashion. The two stabilizer bars 62 have first ends which are pivotally mounted to the receiver hitch 16 in spaced apart relation, and have second ends which are slidably mounted to the outriggers 54, to prevent the tow rack 12 and the motorcycle 14 from swaying relative to the tow vehicle 18 during towing. The tow rack 12 further includes a linear actuator provided by a hydraulic jack 64, which is connected between the mast 52 and the cradle 20 to pivot the cradle 20 about a pivot pin 66 to lift the motorcycle wheel 22 off the ground surface 26 for towing.

FIG. 2 is a top view of the tie down members 34 and 35, and the yaw braces 44 after being secured in position relative to the motorcycle 14 (shown in phantom). The forward ends of the stabilizer bars 62 have tie down rings 72 to which the clasp members 36 of the forward ends of the tie down members 34 are preferably mounted. The hooks 57 of the tie down members 35 are secured in the holes 55 formed in the outriggers 54. The ratchet clasp members 38 of the rearward ends of the tie down members 34 and 35 are secured to the frame 40 of the motorcycle 14. The ratchet clasp members 38 of the tie down members 35 are operated to tighten the tie down members 35 to compress the shocks 42 (shown in FIG. 1), which prevents bouncing of the motorcycle 14 to reduce vibration in the tow rack 12. The rachet clasp members 38 of the tie down members 34 are operated to tighten the die down members 34, to secure the frame 40 of the motorcycle 14 to the rearward ends of the two stabilizer bars 62. The yaw braces 44 extend from the handlebars 46 to the foot pegs 48, to fix the front wheel 24 in fixed alignment in relation to the frame 40 and the rear wheel 22.

FIG. 3 is a side view of one of the yaw braces 44. The yaw brace 44 includes two elongated members provided by two tubes 78 and 80. Ends of the tubes 78 and 80 which are located intermediate of the yaw brace 44 have threaded nuts 82 and 84 rigidly secured thereto, in a reverse thread arrangement. Threaded rod portions 86 and 88 are provided with reverse threads and are rigidly secured to a hand wheel 90, such that turning of the hand wheel 90 in one angular direction will cause the threaded nuts on the ends of the tubes 78 and 80 to move toward the hand wheel 90, reducing the overall length of the yaw brace 44. Rotating the hand wheel 90 in an opposite angular direction will cause the threaded nuts in the ends of the tubes 78 and 80 to move apart, increasing the overall length of the yaw brace 44. An outward end of the elongated member provided by the tube 80 has a clamp 92, which provides an attachment member for securing the forward end of the yaw brace 44 to the motorcycle handlebars 46. The clamp member 92 includes pivot pin 94 for rotatably securing to the clamp member 92 to the end of the tube 80. The clamp member 92 further includes pivot arms 96 and 98, and a lock down lever 100, which preferably operate together to clamp the handlebars 46 between the pivot arms 96 and 98 until the lock down lever 100 is released. An outward end of the elongated member provided by the tube 78 has an attachment member 106 for securing to the motorcycle frame 40, preferably by securing the attachment member 106 to one of the foot pegs 48. The attachment member 106 includes two arms 108 and 110 which are spaced apart in a fork type alignment to define a U-shaped profile for receiving the foot peg 48. A tie strap 112 is secured on one end by a pin 114 and on another end by a friction clutch 116 having a latch lever 118. The foot peg 48 is placed between the two arms 108 and 110 in the U-shaped profile of the attachment member 106, and then the tie strap 112 is pull tightly around a side of the foot peg 48 which is disposed opposite of the U-shaped profile to secure the respective end of the yaw brace 44 to the foot peg 48, which is fixedly secured to the motorcycle frame 40. The outer end of the tie strap 112 is then secured in the clutch 116.

Figure 4:
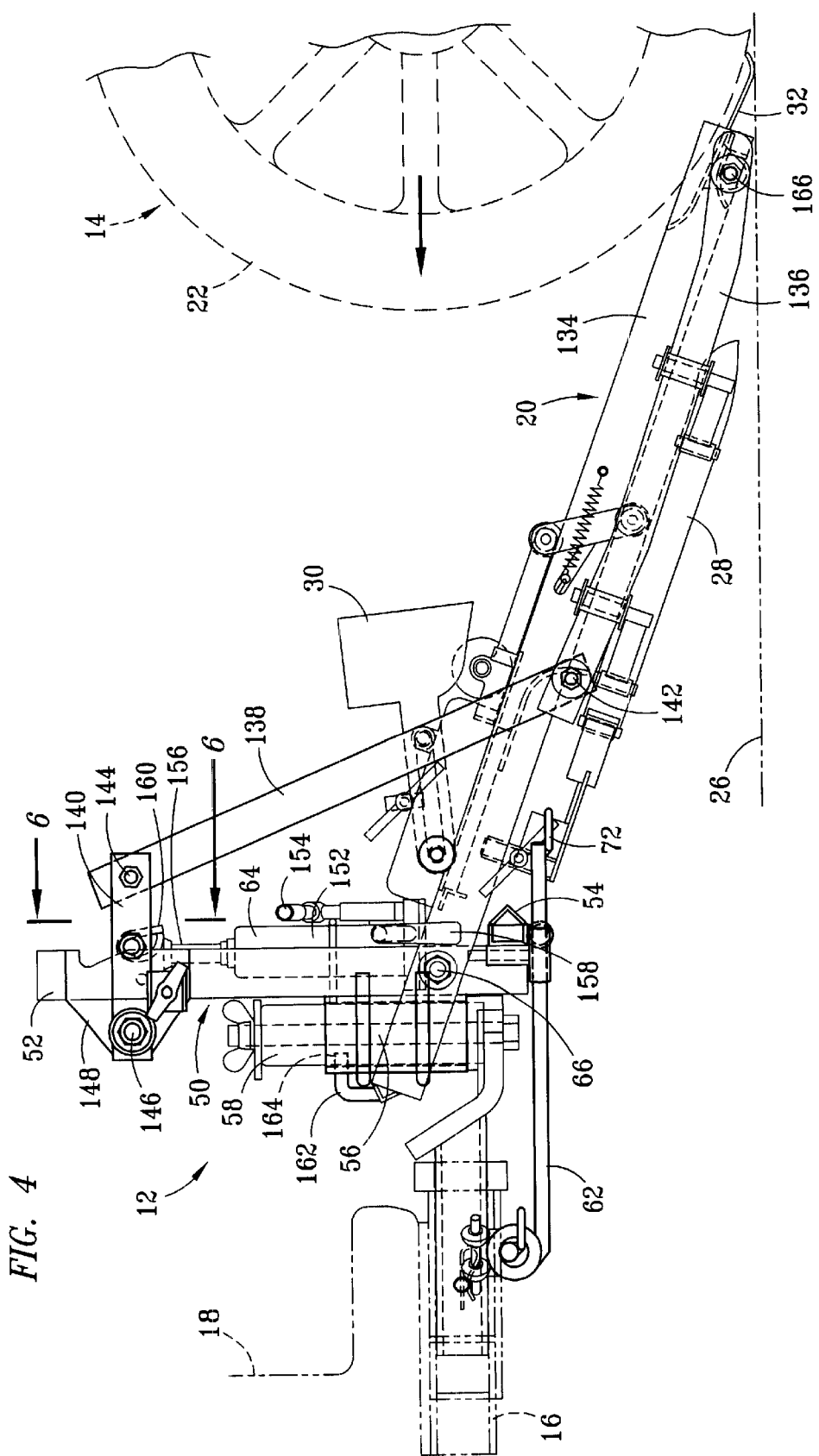
FIG. 4 is a side elevation view of the motorcycle tow rack, with the cradle of the tow rack disposed in a downward position for receiving a front wheel of the motorcycle.

FIG. 4 is a side elevation view of the motorcycle tow rack 12, with the cradle 20 disposed in a downward position for receiving the wheel 22 to load the motorcycle 14 aboard the tow rack 12. The framework comprising the cradle 20 is defined by two lower arms, which are preferably provided by two, spaced apart inner supports 134 and two spaced apart outer supports 136 which are disposed in parallel alignment. (See also FIGS. 11 and 12). One of the inner supports 134 and one of the outer supports 136 located on one side of the tow rack 12 together define one of the lower arms, and the other of the inner supports 134 and the outer supports 136 located on an opposite side of the tow rack 12 together define the other of the two lower arms of the cradle 20. The inner supports 134 each have opposite longitudinal ends which are secured in fixed relation to respective ones of opposite longitudinal ends of the outer supports 136. The cradle 20 is pivotally secured to the mast 52 by the pivot pin 66. Two linkages 138 (see also FIGS. 4 and 5) are pivotally secured on first ends to the cradle 20 by respective pivot pins 142. Opposite ends of the linkages 138 are pivotally secured to respective ends of second linkages 140 by pivot pins 144. The second linkages 140 are pivotally secured to mounting bosses 148 of the mast 52 by pivot pins 146.

A hydraulic jack 64 provides an actuator member for lifting the cradle 20 to support the rear motorcycle wheel 22 above the ground surface 26 for towing. In other embodiments, actuators such as screw jacks, electric motors, hand jacks and the like may be used in place of the linear actuator provided by the hydraulic jack 64. The hydraulic jack 64 has a cylinder 152, which is fixedly mounted to the mast 52. The hydraulic jack 64 further includes a crank arm 154, a lift piston 156 and a valve lock lever arm 158. The crank arm 154 is operated to extend the piston 156 outward from the cylinder body 152 of the hydraulic jack 64 to lift the cradle 20 to a desired position above the ground surface 26. As the crank arm 154 is operated to extend the piston 156, the valve lock lever arm 158 remains in a closed position to prevent hydraulic fluid from passing through a bypass valve of the hydraulic jack 64. The valve arm lever 158 remains in the closed position until it is desired to retract the lift piston 156 back into the cylinder 152 of the hydraulic jack 64, and then the valve arm lever 158 is moved to an open position (not shown) to pass a portion of the hydraulic fluid within the jack 64, such that the lift piston 156 will return to a retracted position. A cam member 160 is pivotally mounted to the linkages 140, for engaging the uppermost end of the lift piston 156, to accommodate rotation of the linkages 140 relative to the hydraulic jack 64, which is mounted in fixed relation to the mast 52.

The forward end of the cradle 20 has a lock pin 162 extending therefrom in fixed relation to the cradle 20. The lock pin 162 is shaped with approximately a ninety degree bend such that the lock pin 162 will extend from the end of the cradle 20 and into hole 164 in the receiver sleeve 56 and the pivot post 58, to prevent rotation of the cradle 20 relative to the pivot post 58 as a user is loading the motorcycle 14 onto the tow rack 12. The lock pin 162 is disposed such that it will automatically fit within the hole 164 in the receiver sleeve 56 and the pivot post 58 when the cradle framework 20 is lowered into the downward position for loading the front wheel 22 into the tow rack cradle 20, and will be automatically removed from within the holes 164 as the cradle framework 20 is raised to lift the wheel 22 above the ground surface 26.

The cradle 20 further includes a trip plate 32 which will be rotated such that a rearward end lays against the ground surface 26 when the cradle 20 is disposed in the downward position for receiving the motorcycle wheel 22. The trip plate 32 is shaped to rotate around a pivot pin 166 which rotatably secures the trip plate 32 to the cradle 20. As the lowermost end of the wheel 22 passes above the pivot pin 166, the trip plate 32 will rotate from the position shown in FIG. 4 to the position shown in FIG. 5, in which the trip plate 32 is disposed behind the wheel 22 and prevents it from leaving the cradle 20. The trip plate 32 is preferably provided by a flat plate of metal, which has forward and rearward ends which are curved upwards relative to a central portion of the flat plate of metal.

Figure 5:
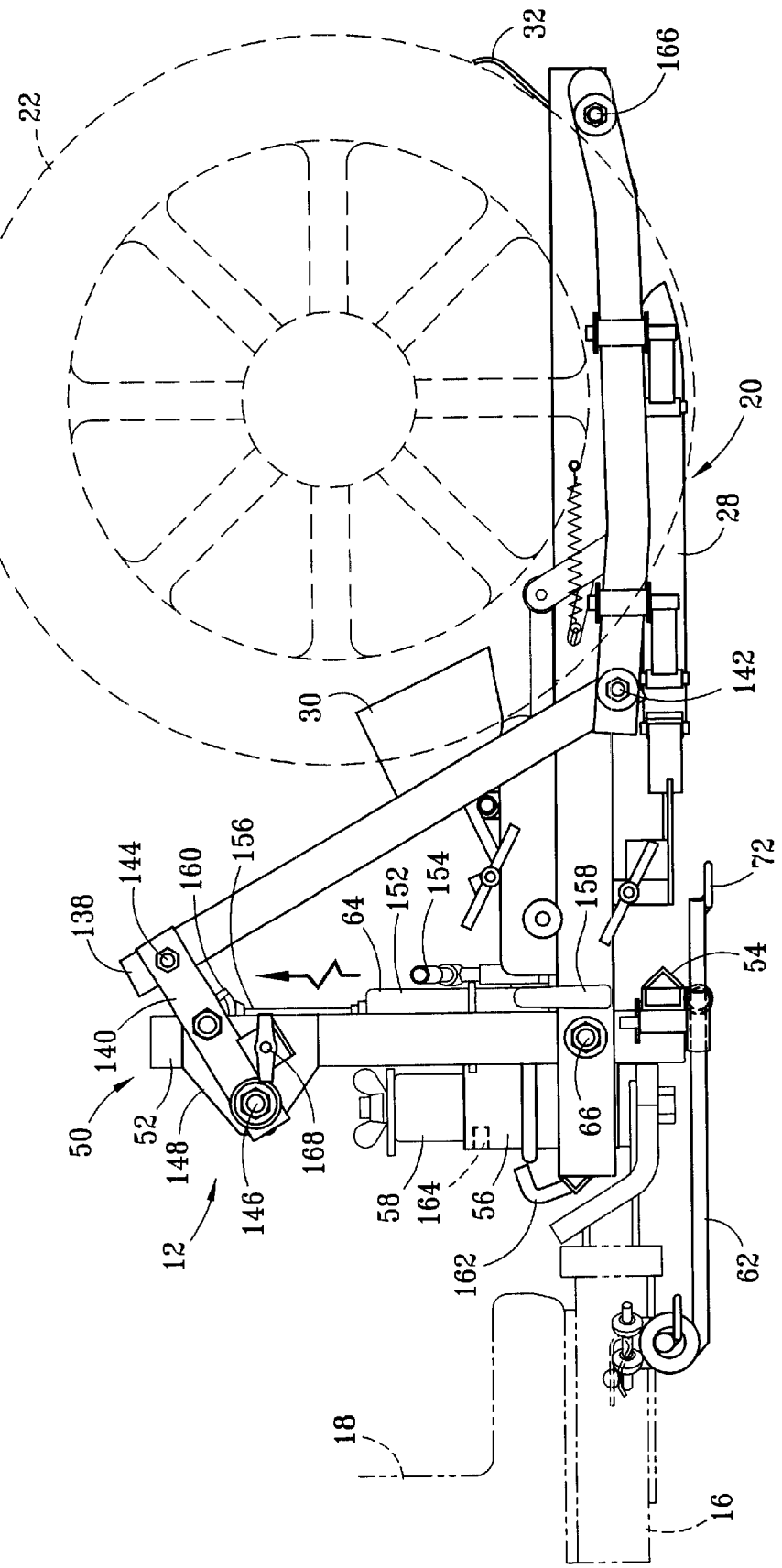
FIG. 5 is a side elevation view of the motorcycle tow rack with the cradle disposed in an upward, towing position, supporting the front wheel of the motorcycle above a ground surface.

FIG. 5 is a side elevation view of the motorcycle tow rack 12, with the cradle 20 disposed in an upward towing position, supporting the wheel 22 of the motorcycle 14 above the ground surface 26. The trip plate 32 is shown after it has been rotated around the pin 166 to a position for retaining the motorcycle wheel 22 within the wheel cradle 20. The crank arm 154 of the hydraulic jack 64 has been operated to extend the piston 156 outward from the cylinder 15 to press the piston 156 against the cam 160 and urge the linkages 140 to rotate relative to the pivot pin 146 and the mast 52. The linkages 140 are connected to respective ones of the linkages 138 and move the linkages 138 upward to rotate the cradle 20 relative to the pivot pin 66 and the mast 52, to lift the rearward end of the cradle 20 upwards above the ground surface 26. The lock pin 162 is automatically removed from within the holes 164 in the receiver sleeve 56 and the pivot post 58 as the cradle 20 is rotated to a lifted position, such that the cradle framework 20 will rotate relative to a longitudinal, vertical axis of the pivot post 58 after the lock pin 162 is removed. A cradle latch 168 is provided for preventing the linkages 140 from moving relative to the boss 148 of the mast 52 once the cradle 20 is lifted fully upward, and which is latched once the cradle 20 is fully disposed in the upward, towing position.

FIG. 6 is a sectional view of a top portion of the mast 52 showing the cradle latch 168, taken along section line 6—6 of FIG. 4. The cradle latch 168 includes a lock pin 170 which is mounted to a handle 172. The lock pin 170 is secured to one of the linkages 140 by a bearing housing 174. The bearing housing includes a bias spring 176 to urge the pin 170 into an inward position, within a hole 178 in the boss 148 of the mast 52. Once the linkages 140 are moved fully upwards by the piston 156 pushing against the cam member 160, the latch pin 170 will insert into the hole 178 in the boss 148, to latch the linkages 140 and the cradle 20 in the upwards, towing position. Then, to lower the cradle 20 from the upwards, towing position shown in FIG. 5 into the downward, loading position shown in FIG. 4, the handle 172 is pulled outward to remove the lock pin 170 from within the hole 178, and the hydraulic pressure can be bled off the hydraulic jack 64 by turning the valve handle 158 (shown in FIG. 5). Also shown in FIG. 6 is the cam member 160 mounted to a pivot pin 180 and extending between the two linkages 140.

FIG. 7 is a sectional view of a top portion of the mast 52, taken along section line 7—7 of FIG. 6. The cam member 160 which extends between the two linkages 140 is shown pivotally mounted to the pivot pin 180. The cam member 160 is engaged by the uppermost ends of the lift piston 156 of the jack 64 for accommodating rotation of the linkages 140 relative to the end of the piston 156 of the hydraulic jack 64, since the cylinder 152 of the hydraulic jack 64 is mounted in a fixed position relative to the mast 52.

FIG. 8 is and exploded view of the motorcycle tow rack 12, showing first and second framework portions 50 and 20 raised above a pivot post 58 mounted to the receiver hitch 16 of the tow vehicle 18. The pivot post 58 is preferably provided by a cylindrical member 182 having a central, longitudinal axis. A rod 184 preferably extends through the cylindrical member 182, and has a threaded upper end which extends above the top of the cylindrical member 182. The receiver sleeve 56 of the rack frame 50 slidably fits over the cylindrical member 182 of the pivot post 58, in a rotating arrangement. A thrust bearing 183 is mounted to the bottom of the cylindrical member 182 for supporting the receiver sleeve 56. The upper threaded end of the rod 184 will extend above the receiver sleeve 56 for receiving a retainer cap 186 and a fastener 188, such as a wing nut, for securing the retainer cap 186 to the top of the pivot post 58. The retainer cap 186 is sized to prevent the receiver sleeve 56 from being removed from the pivot post 58.

FIG. 9 is a sectional view of a portion of the motorcycle tow rack 12, taken along section line 9—9 of FIG. 8. The receiver sleeve 56 has a bronze bushing 190 disposed therein for rotatably securing around the pivot post 58. A hole 192 extends through the receiver sleeve 56 for receiving a latch pin 196 of a pivot latch 194. The pivot latch 194 is provided for retaining the tow rack 12 in a storage position shown in FIG. 10, rotated approximately ninety degrees about the pivot post 58 from a towing position shown in FIG. 11. The pivot latch 194 includes a lever 198 which is rigidly mounted to the latch pin 196. The pivot latch 194 is rotatably mounted to a boss 200, which is preferably welded to the receiver sleeve 56. The pivot latch is also preferably spring biased to urge the pivot pin 196 to extend into the hole 192 in the receiver sleeve 56.

Figure 10:
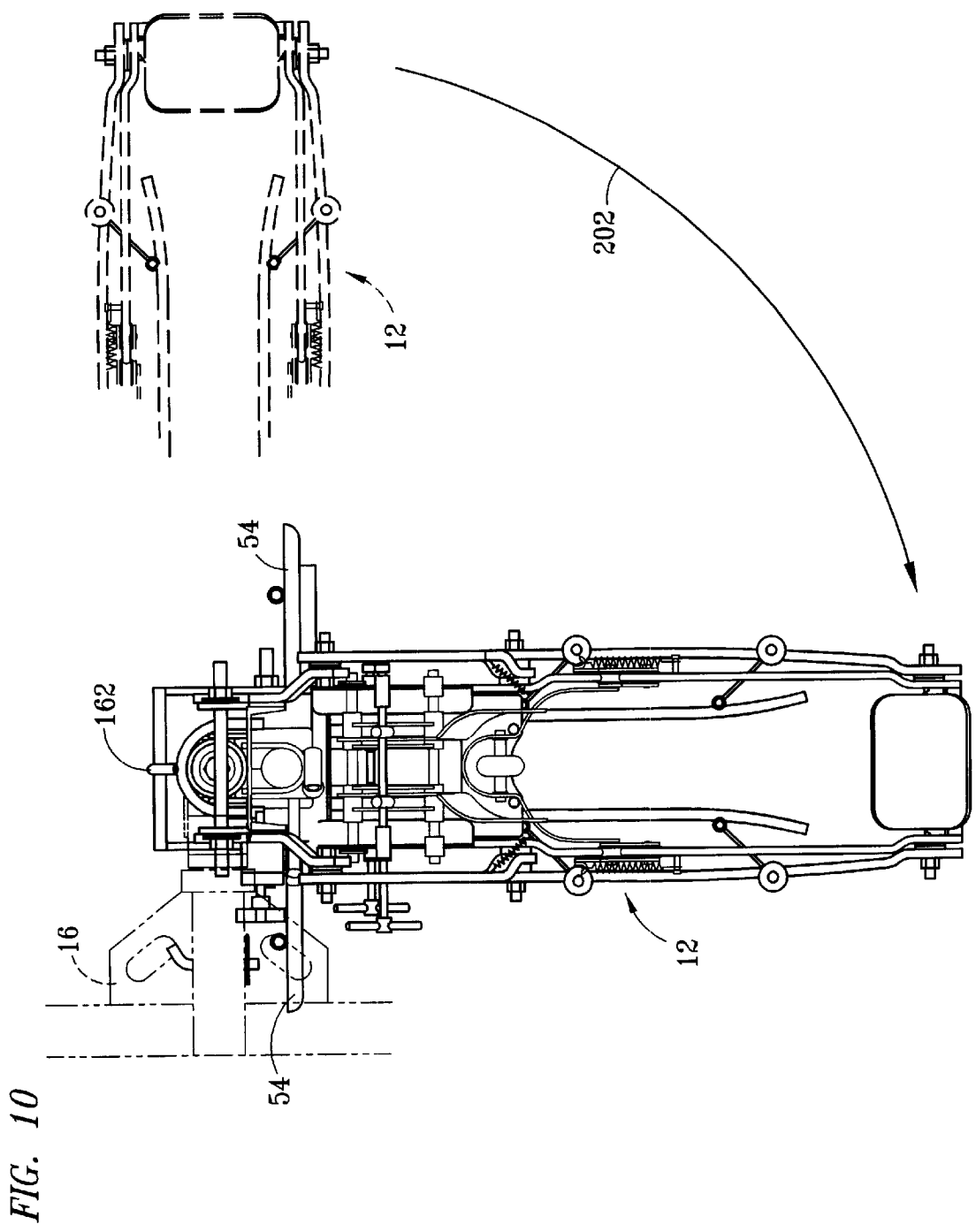
FIG. 10 is a top view of the motorcycle tow rack shown in a storage position, for transport of the tow rack when not used for towing the motorcycle.

FIG. 10 is a top view of the motorcycle tow rack 12 shown in the storage position for transport of the tow rack 12 when not used for towing the motorcycle 14. The tow rack 12 is shown in phantom disposed in angular alignment relative to the receiver hitch 16 (shown in phantom) for towing the motorcycle 14. The tow rack 12 is pivoted approximately ninety degrees in the angular direction 202 to the storage position shown in FIG. 10, and then the pivot latch 194 (shown in FIG. 9) is operated to latch the pin 196 in the hole 192 in the receiver sleeve 56 to secure the tow rack 12 in the storage position, with the length of the tow rack 12 extending perpendicular to the direction of travel of the tow vehicle 18, rather than parallel to the direction of travel. The stabilizer bars 62 are removed prior to rotating the tow rack 12 in the angular direction 202, from the towing position of FIG. 11 to the storage position of FIG. 10.

Referring again to FIG. 8, the receiver post 60 is secured in the receiver tube of the receiver hitch 16 (shown in phantom) by a hitch pin 204, which is secured in place by a fastener 206, shown as a coffer pin. One of the two stabilizer bars 62 is shown having a rearward end to which the tie down ring 72 is welded. A collar 208 is slidably mounted to the stabilizer bar 62. The tie down ring 72 provides a stop to prevent the collar 208 from sliding off of the rearward end of the stabilizer bar 62. A mounting pin 210 is welded to the collar 208, and extends upwards from the collar 208 for being received within a collar 212. The collar 212 is welded to one of the outriggers 54 of the first rack frame 50 of the tow rack 12, and is aligned in vertical alignment for receiving the mounting pin 210 of the collar 208. The mounting pin 210 will rotate within the outrigger collar 212 in angular directions around a vertical, longitudinal axis of the pin 210 to rotatably secure the collar 208 to the rack frame 50. The mounting pin 210 has a hole 216 for receiving a latch pin 214, which prevents the pin 210 from slipping from within the collar 212. The longitudinal axes of the mounting pins 210 are preferably fixed at right angles to central axes of the collars 208, such that the stabilizer bars 62 are rotatably secured to the rack frame 50 for rotating in angular directions about the longitudinal axes of the mounting pins 210 which are perpendicular to the directions which the stabilizer bars 62 slide relative to the rack frame 50.

Figure 11:
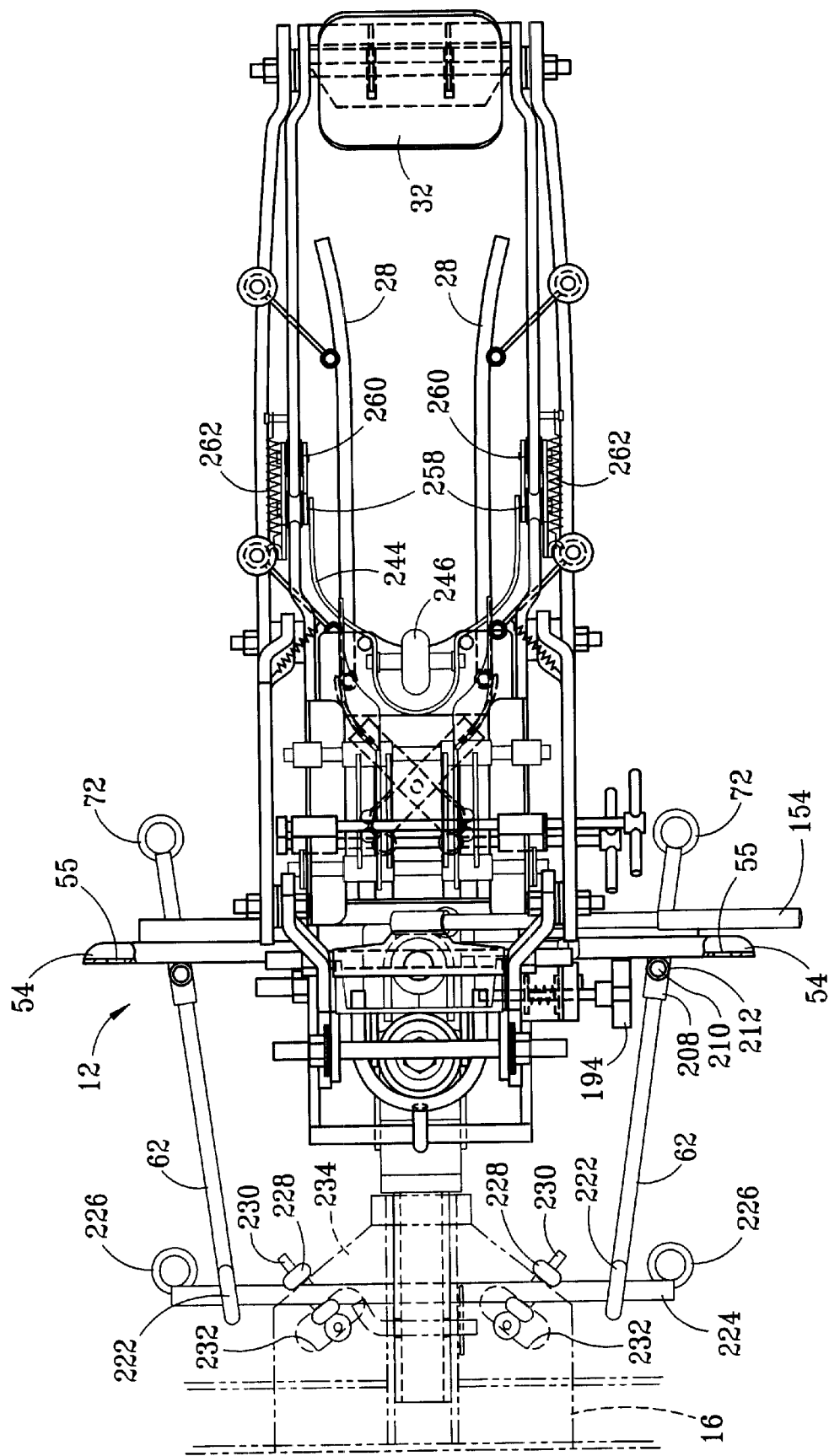
FIG. 11 is a top view of the tow rack.
Figure 12:
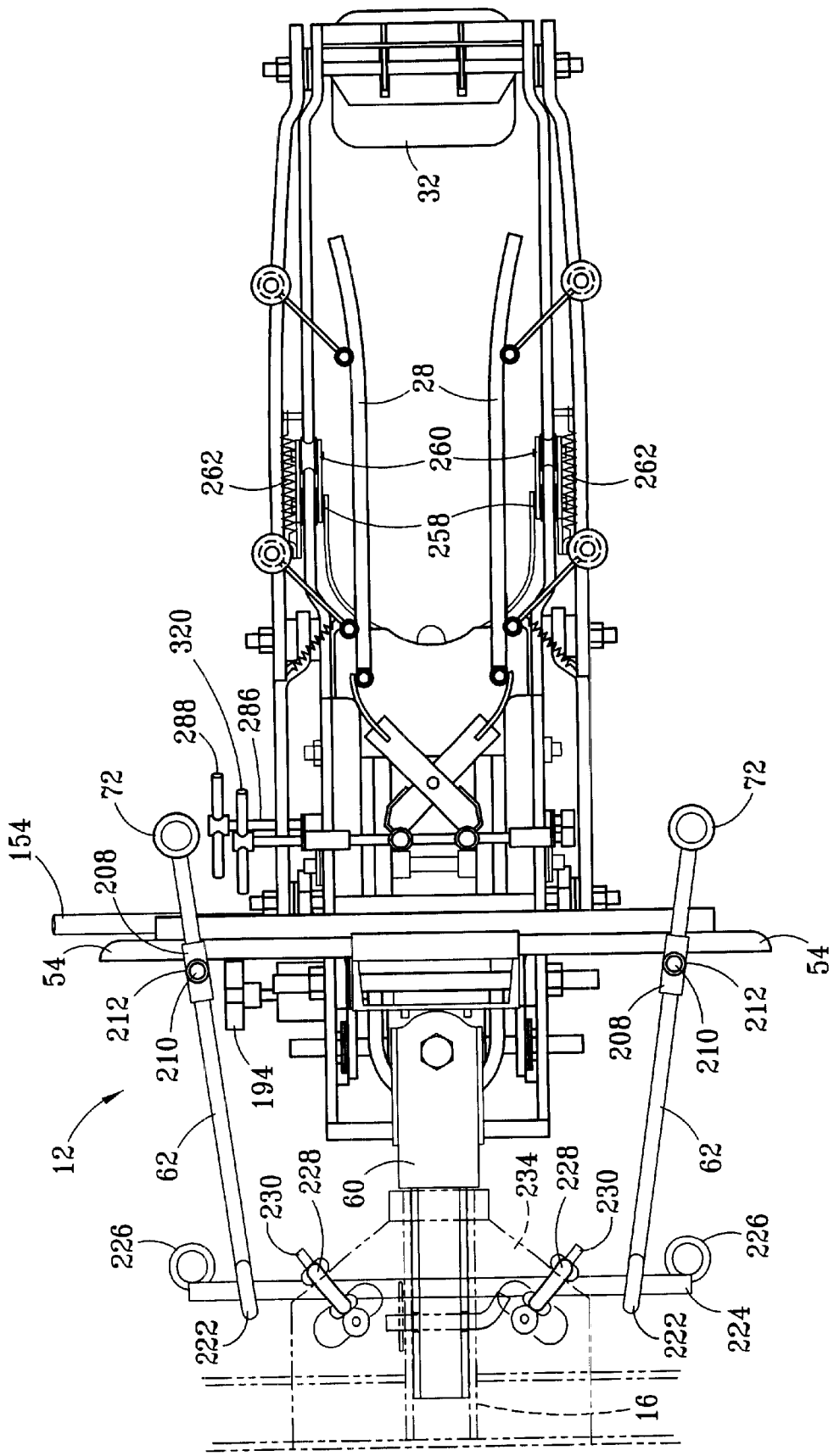
FIG. 12 is a bottom view of the tow rack.

Referring to FIGS. 8, 11 and 12, FIG. 11 is a top view of the motorcycle tow rack 12 and FIG. 12 is a bottom view of the motorcycle tow rack 12. Mounting rings 222 are welded to the forward ends of respective ones of the stabilizer bars 62. A mounting bar 224 extends through the mounting rings 222 for securing the forward ends of the stabilizer bars 62 to the receiver hitch 16 (shown in phantom). The mounting rings 222 are sized to freely slide upon the mounting bar 224. Additional tie down rings 226 are welded to opposite ends of the mounting rod 222, and provide both additional tie down points and stops to prevent the mounting rings 222 of the stabilizer bars from sliding off of the mounting bar 224. Two devises 228 are spaced apart and secured in the tow chain tie down holes 232 of the receiver hitch 16 (shown in phantom) by clevis pins 230. The mounting bar 224 is secured to the receiver hitch 16 by the devises 228, to secure the forward ends of the stabilizer bars 62 to the receiver hitch 16. Preferably, the mounting bar 224 is secured in fixed relation to the receiver hitch 16, such that it will laterally extend for substantially equal distances on opposite sides of a plate 234 of the receiver hitch 16.

FIG. 13 is a partial top view of the tow rack 12, showing a shuttle brace 242 for supporting the motorcycle wheel 22 in the tow rack 12 as the wheel 22 is being secured to the tow rack 12. The shuttle brace 242 includes a rearward facing, U-shaped brace member 244 and an engagement wheel 246. A pin 248 rotatably mounts the engagement wheel 246 to a forward end portion of the shuttle brace member 244. Brace pins 252 fixedly secure the brace member 244 to a shuttle plate 254. The shuttle plate 254 is mounted to the inner supports 134 of the cradle framework 20 by four rollers 256. In other embodiments, the shuttle plate 254 may be formed to slide directly on the inner supports 134, without having the rollers 256. Bearings 258 and 260 moveably secure the brace member 244 to opposite respective sides of the inner support rails 134. Shuttle springs 262 are secured between respective ones of the shuttle brace members 242 and the inner supports 134 of the cradle 20 for urging the shuttle brace members 242 to move into a rearward position. Rearward ends of the springs 262 are secured to the inner supports 134 by respective mounting posts 264, which are preferably welded to respective ones of the inner supports 134. Forward ends of the springs 262 are secured to mounting brackets 266, which are rigidly secured to the brace member 244.

A rider will typically ride the motorcycle 14 onto the motorcycle tow bracket 12, with the cradle 20 disposed in the downward, loading position shown in FIG. 4. The wheel 22 of the motorcycle 14 will engage the wheel 246, to initiate movement of the shuttle brace 242 in a forward direction. The rider will move the rear wheel 22 of the motorcycle 14 forward relative to the tow vehicle 18, moving the shuttle brace 242 forward, until the rear wheel 22 engages an intermediate portion of the clamp plates 30. Then, the rider will stop the motorcycle 14, dismount from the motorcycle 14, and tighten the clamp plates 30 and the clamp arms 28 to secure the motorcycle 14 to the tow rack 12. The shuttle brace 242, in combination with the trip plate 32 (shown in FIG. 1), will retain the motorcycle 14 in an upright position as the rider dismounts the motorcycle 14 and begins to secure the motorcycle 14 to the tow rack 12.

FIG. 14 is a partial top view of the tow rack 12, showing a clamp plate assembly 272 for securing the motorcycle wheel 22 in the motorcycle tow rack 12 for transport. The clamp plate assembly 272 includes the two clamp plates 30 having rearward end portions which clamp against the motorcycle wheel 22. Forward portions of the clamp plates 30 are fixedly secured to respective pairs of four bushings 274, which are spaced apart. Two of the bushings 274 are slidably mounted to the rod 276 and two of the bushings 274 are slidably mounted to the rod 278. Two mounting bushings 280 rigidly secure opposite ends of the rod 276 to the inner support 134 of the cradle framework 20. Two mounting nuts 282 rigidly secure the rod 278 to the inner support 134. Two mounting bushings 284 rotatably secure a threaded rod 286 to the inner support 134. The threaded rod 286 is threaded such that opposite ends of the rod 286 are threaded in opposite angular directions. A T-bar grip handle 288 is rigidly secured to one end of the rod 286. Two threaded sleeves 290 are secured to each of the clamp plates 30, and are threaded in opposite relative directions for receiving the opposite ends of the rod 286, such that rotation of the rod 286 in one angular direction will move the clamp plates 30 closer together and rotation of the rod 286 in an opposite angular direction will move the two clamp plates 30 further apart. The clamp plates 30 move in parallel alignment, wherein the clamp plates 30 remain in fixed angular positions relative to one another as they clamp plates 30 are first moved closer together and then later moved further apart. Thus, after dismounting from the motorcycle 14, the rider will grip the T-bar grip handle 288 and rotate it in the appropriate angular direction to squeeze the motorcycle wheel 22 tightly between the two clamp plates 30.

FIG. 15 is partial, bottom view of the motorcycle tow rack 12, showing a clamp arm assembly 302 for securing a lower portion of the motorcycle wheel 22 in the tow rack 12 for transport. The clamp arm assembly 302 includes a scissor assembly 304 to which the two clamp arms 28 are mounted for controlling relative movement of the clamp arms 28. The scissor assembly 304 includes two link members 306 and 308 which are pivotally secured together by a pivot pin 310. Two links 312 connect from the scissor link members 306 and 308 to respective ones of the clamp arms 28. The two links 312 are pivotally connected to the clamp arms 28 by the pivot pins 312 and 314, respectively. A rod 316 having threads of opposite angular directions on oppositely disposed end portions is rotatably secure to the inner support member 134 of the framework of the cradle 20 by two mounting bushings 318. A T-bar grip handle 320 is mounted to one end of the rod 316. Two bushings 322 and 324, are threaded in opposite angular directions are secured to respective ones of the clamp links 306 and 308 of the scissor assembly 304, and are threadingly secured to the rod 316 such that rotation of the rod 316 in one angular direction moves the clamp arms further apart, and then rotation of the reverse threaded rod 316 in a opposite angular direction causes the clamp arms 28 to move closer together. Four linkages 326 have first ends which are pivotally connected to the clamp arms 28 at pivot points 328, and have second ends which are pivotally connected to the outer support member 136 of the cradle 20 at pivot pins 330, such that the clamp arms 28 will remain in a parallel configuration when moved. The clamp arms 28 remain in the parallel configuration, that is in parallel alignment, since the clamp arms 28 remain in fixed angular positions relative to one another as they are moved inward and outward relative to the wheel 22 of the motorcycle 14. Bias springs 332 are provided for urging the clamp arms 28 into open positions, with the clamp arms 28 spaced apart. The rearward ends 334 of the clamp arms 28 are formed to expand outward in a rearward direction for guiding the motorcycle wheel 22 between the two clamp arms 28.

Although the above description discusses the rear wheel 22 being disposed in the forward position, secured in the cradle 20 and lifted from the ground surface 26, and the front wheel 24 being disposed in the rearward position in rolling contact with the ground surface 26, it should be understood to include an alternative configuration in which the front wheel 24 is disposed in the forward position, secured in the cradle 20 and lifted from the ground surface 26 and the rear wheel 22 is disposed in the rearward position, in rolling contact with the ground surface 26. Preferably, the rear wheel 22 is disposed in the forward position, secured in the cradle 20, and the front wheel 24 is disposed in the rearward position in rolling engagement with the ground surface 26 to prevent damage to gearing of a transmission of the motorcycle 14 which may occur when the motorcycle 14 is towed at highway speeds with the rear wheel 22 disposed in the rearward position in rolling engagement with the ground, even when the motorcycle transmission is placed in neutral. At slower speeds, such as those not exceeding thirty miles per hour, the motorcycle 14 may be towed with the rear wheel 22 in rolling engagement with the ground without damaging the motorcycle transmission, provided the transmission is placed in neutral and the motorcycle is not towed for extended distances. When the motorcycle 14 is towed with the front wheel 24 forward, it may also be desirable to provide a dolly (not shown) having wheels which roll to support the rear wheel 22 off the ground surface 26.

Although the preferred embodiment has been described in detail, it should be understood that various changes, substitutions and alterations can be made therein without departing from the spirit and scope of the invention as defined by the appended claims.

What is claimed is:

1. A motorcycle tow rack for mounting to a receiver hitch, comprising:
   a receiver hitch post having a forward portion for fitting within the receiver hitch, and a rearward portion defining a pivot post;
   a rack frame having a receiver sleeve pivotally secured to said pivot post, and having a mast which extends vertically upwards;
   two stabilizer bars pivotally secured to the receiver hitch and slidably secured to said rack frame;
   two lower arms which are secured to the rack frame and which extend rearward to provide a cradle for receiving a forwardly disposed wheel of a motorcycle;
   tie down members which extend from the motorcycle to the tow rack, and secure the forwardly disposed wheel to said two lower arms defining said cradle; and
   yaw braces extending between a frame of the motorcycle and a steering assembly of the motorcycle, to secure the front wheel of the motorcycle in substantially fixed relation to the frame of the motorcycle.

2. The motorcycle tow rack of claim 1, further comprising two clamp plates mounted to said two lower arms in spaced apart alignment for clamping to opposite sides of the forwardly disposed wheel of the motorcycle.

3. The motorcycle tow rack of claim 2, wherein said two clamp plates have threaded bushings mounted thereto, said threaded bushings being aligned for receiving opposite ends of a threaded rod having threads of opposite angular alignment on said opposite ends, such that rotation of said threaded rod in a first angular direction moves said clamp plates apart and rotation of said threaded rod in an opposite angular direction moves said clamp plates closer together to clamp on opposite sides of the forwardly disposed wheel of the motorcycle.

4. The motorcycle tow rack of claim 3, wherein said two clamp plates each have at least one bearing defined therein, mounted to at least one rod for slidably engaging said at least one rod to move said clamp plates in parallel in response to rotation of said threaded rod.

5. The motorcycle tow rack of claim 1, further comprising two clamp arms mounted to said two lower arms, in spaced apart alignment for clamping to opposite sides of a lower portion of the forwardly disposed wheel of the motorcycle.

6. The motorcycle tow rack of claim 5, wherein said two clamp arms are mounted to said two lower arms by respective linkages which are pivotally connected to respective ones of said two lower arms.

7. The motorcycle tow rack of claim 6, further comprising two scissor links which are pivotally connected together at central portions thereof, said scissor links having rearward ends which are pivotally connected to respective ones of said two clamp arms and having forward ends which are connected to threaded bushings, said threaded bushings being threadingly secured to opposite end sections of a threaded rod, wherein one of said opposite end sections has threads which extend in an opposite angular direction than threads of said other opposite end section.

8. The motorcycle tow rack of claim 1, further comprising a shuttle brace having at least one brace member which extends on opposite sides of the forwardly disposed wheel of the motorcycle, said at least one brace member being slidably moveable from a rearward position to a forward position for slidably receiving the forwardly disposed wheel into said cradle defined by said two lower arms and supporting the motorcycle in a substantially upright position.

9. The motorcycle tow rack of claim 8, further comprising bearings rotatably mounted to said shuttle brace for slidably securing said shuttle brace to respective ones of said two lower arms, and a return spring for urging said brace member into said rearward position.

10. The motorcycle tow rack of claim 1, further comprising a linear actuator secured on one end to said rack frame and secured on another end to said two lower arms defining said cradle for selectively pivoting said cradle relative to said rack frame to lift said forwardly disposed motorcycle wheel above a ground surface.

11. The motorcycle tow rack of claim 10, wherein said linear actuator is a hydraulic jack which is rigidly mounted to said mast of said rack frame, and connected to said two lower arms defining said cradle by two linkages which are pivotally connected together and interconnected between said rack frame and respective ones of said two lower arms, said motorcycle tow rack further comprising a cam member engaged by a piston end of said hydraulic jack for moving a first one of said two linkages to move a second one of said two linkages to lift said cradle and the forwardly disposed motorcycle wheel above the ground surface.

12. The motorcycle tow rack of claim 1, wherein two of said tie down members have forward ends which are secured to rearward ends of said stabilizer bars and rearward ends which are secured to the motorcycle frame.

13. A motorcycle tow rack for mounting to a receiver hitch, comprising:

a receiver hitch post having a forward portion for fitting within the receiver hitch, and a rearward portion defining a pivot post;

a rack frame having a receiver sleeve pivotally secured to said pivot post, and having a mast which extends vertically upwards;

two stabilizer bars having forward ends which are pivotally secured to the receiver hitch, and rearward ends which are pivotally and slidably secured to opposite sides of said rack frame;

two lower arms which are secured to the rack frame and which extend rearward to provide a cradle for receiving a forwardly disposed wheel of a motorcycle;

tie down members which are secured to the rack frame and to a frame of the motorcycle frame, and secure the forwardly disposed wheel to said two lower arms defining said cradle;

two clamp plates mounted to said two lower arms in spaced apart alignment for clamping to opposite sides of the forwardly disposed wheel of the motorcycle; and two clamp arms mounted to said two lower arms, in spaced apart alignment for clamping to opposite sides of a lower portion of the forwardly disposed wheel of the motorcycle.

14. The motorcycle tow rack of claim 13, further comprising yaw braces which extend between the motorcycle frame and a steering assembly of the motorcycle, to secure the front wheel of the motorcycle in substantially fixed relation to the frame of the motorcycle.

15. The motorcycle tow rack of claim 13, further comprising a shuttle brace having at least one brace member which extends on opposite sides of the forwardly disposed wheel of the motorcycle, said at least one brace member being slidably moveable from a rearward position to a forward position for slidably receiving the forwardly disposed wheel into said cradle defined by said two lower arms and supporting the motorcycle in a substantially upright position.

16. The motorcycle tow rack of claim 13, wherein said two clamp plates have threaded bushings mounted thereto, said threaded bushings being aligned for receiving opposite ends of a threaded rod having threads of opposite angular alignment on said opposite ends, such that rotation of said threaded rod in a first angular direction moves said clamp plates apart and rotation of said threaded rod in an opposite angular direction moves said clamp plates closer together to clamp on opposite sides of the forwardly disposed wheel of the motorcycle.

17. The motorcycle tow rack of claim 13, further comprising two scissor links which are pivotally connected together at central portions thereof, said scissor links having rearward ends which are pivotally connected to respective ones of said two clamp arms and having forward ends which are connected to threaded bushings, said threaded bushings being threadingly secured to opposite end sections of a threaded rod, wherein one of said opposite end sections has threads which extend in an opposite angular direction than threads of said other opposite end section.

18. The motorcycle tow rack of claim 13, further comprising a linear actuator secured on one end to said rack frame and secured on another end to said two lower arms defining said cradle for selectively pivoting said cradle relative to said rack frame to lift said forwardly disposed motorcycle wheel above a ground surface, wherein said linear actuator is a hydraulic jack which is rigidly mounted to said mast of said rack frame, and connected to said two lower arms defining said cradle by two linkages which are pivotally connected together and interconnected between said rack frame and respective ones of said two lower arms, said motorcycle tow rack further comprising a cam member for being engaged by a piston end of said hydraulic jack for moving a first one of said two linkages to move a second one of said two linkages to lift said cradle and the forwardly disposed motorcycle wheel above the ground surface.

19. The motorcycle tow rack of claim 13, wherein said tie down members comprise two frame tie down members having forward ends which are secured to said rack frame and having rearward ends which are secured to the motorcycle frame in proximity to shocks of the motorcycle, and the shocks are compressed by tightening of said two frame tie down members.

20. The motorcycle tow rack of claim 19, wherein said tie down members comprise two stabilizer tie down members having first ends which are secured to rearward ends of said stabilizer bars and having second ends which are secured to the motorcycle frame.

21. A motorcycle tow rack for mounting to a receiver hitch, comprising:

a receiver hitch post having a forward portion for fitting within the receiver hitch, and a rearward portion defining a pivot post;

a rack frame having a receiver sleeve pivotally secured to said pivot post, and having a mast which extends vertically upwards;

two stabilizer bars having forward ends which are pivotally secured to the receiver hitch, and rearward ends which are pivotally and slidably secured to opposite sides of said rack frame;

two lower arms which are secured to the rack frame and which extend rearward to provide a cradle for receiving a forwardly disposed wheel of a motorcycle;

tie down members for securing the forwardly disposed wheel to said two lower arms defining said cradle;

yaw braces extending between a frame of the motorcycle and a steering assembly of the motorcycle, to secure the front wheel of the motorcycle in substantially fixed relation to the frame of the motorcycle;

two clamp plates mounted to said two lower arms in spaced apart alignment for clamping to opposite sides of the forwardly disposed wheel of the motorcycle;

wherein said two clamp plates have threaded bushings mounted thereto, said threaded bushings being aligned for receiving opposite ends of a threaded rod having threads of opposite angular alignment on said opposite ends, such that rotation of said threaded rod in a first angular direction moves said clamp plates apart and rotation of said threaded rod in an opposite angular direction moves said clamp plates closer together to clamp on opposite sides of the forwardly disposed wheel of the motorcycle;

said two clamp plates each have at least one bearing defined therein, mounted to at least one rod for slidably engaging said at least one rod to move said clamp plates in parallel in response to rotation of said threaded rod;

two clamp arms mounted to said two lower arms, in spaced apart alignment for clamping to opposite sides of a lower portion of the forwardly disposed wheel of the motorcycle;

said two clamp arms being mounted to said two lower arms by respective linkages which are pivotally connected to respective ones of said two lower arms;

two scissor links which are pivotally connected together at central portions thereof, said scissor links having rearward ends which are pivotally connected to respective ones of said two clamp arms and having forward ends which are connected to threaded bushings, said threaded bushings being threadingly secured to opposite end sections of a threaded rod, wherein one of said opposite ends sections has threads which extend in an opposite angular directions than threads of said other opposite end section;

a shuttle brace having at least one brace member which extends on opposite sides of the forwardly disposed wheel of the motorcycle, said at least one brace member being slidably moveable from a rearward position to a forward position for slidably receiving the forwardly disposed wheel into said cradle defined by said two lower arms and supporting the motorcycle in a substantially upright position; and bearings rotatably mounted to said shuttle brace for slidably securing said shuttle brace to respective ones of said two lower arms, and a return spring for urging said brace member into said rearward position.

22. The motorcycle tow rack of claim 21, wherein said tie down members comprise:

two frame tie down members having forward ends which are secured to said rack frame and having rearward ends which are secured to the motorcycle frame in proximity to shocks of the motorcycle, and the shocks are compressed by tightening of said two frame tie down members; and two stabilizer tie down members having first ends which are secured to rearward ends of said stabilizer bars and having second ends which are secured to the motorcycle frame.

23. The motorcycle tow rack of claim 22, further comprising a linear actuator secured on one end to said rack frame and secured on another end to said two lower arms defining said cradle for selectively pivoting said cradle relative to said rack frame to lift said forwardly disposed motorcycle wheel above a ground surface.

24. The motorcycle tow rack of claim 23, wherein said linear actuator is a hydraulic jack which is rigidly mounted to said mast of said rack frame, and connected to said two lower arms defining said cradle by two linkages which are pivotally connected together and interconnected between said rack frame and respective ones of said two lower arms, said motorcycle tow rack further comprising a cam member engaged by a piston end of said hydraulic jack for moving a first one of said two linkages to move a second one of said two linkages to lift said cradle and the forwardly disposed motorcycle wheel above the ground surface.

* * * * *